US011645427B2

(12) United States Patent
Young et al.

(10) Patent No.: US 11,645,427 B2
(45) Date of Patent: May 9, 2023

(54) DETECTING UNAUTHORIZED ACTIVITY RELATED TO A DEVICE BY MONITORING SIGNALS TRANSMITTED BY THE DEVICE

(71) Applicant: Bank of America Corporation, Charlotte, NC (US)

(72) Inventors: Michael R. Young, Davidson, NC (US); Daniel J August, Denver, NC (US); Tomas M. Castrejon, III, Fort Mill, SC (US); Richard Martin Seymour Scot, Huntersville, NC (US); Neal Aaron Slensker, Fort Mill, SC (US)

(73) Assignee: Bank of America Corporation, Charlotte, NC (US)

( * ) Notice: Subject to any disclaimer, the term of this patent is extended or adjusted under 35 U.S.C. 154(b) by 201 days.

(21) Appl. No.: 17/106,122

(22) Filed: Nov. 29, 2020

(65) Prior Publication Data
US 2022/0171882 A1 Jun. 2, 2022

(51) Int. Cl.
*G06F 21/71* (2013.01)
*G06Q 20/20* (2012.01)
(Continued)

(52) U.S. Cl.
CPC ............ *G06F 21/71* (2013.01); *G06F 21/554* (2013.01); *G06F 21/86* (2013.01); *G06K 7/0091* (2013.01);
(Continued)

(58) Field of Classification Search
CPC ........ G06F 21/71; G06F 21/86; G06F 21/554; G06K 7/0091; G06Q 20/202; G07F 19/2055
See application file for complete search history.

(56) References Cited

U.S. PATENT DOCUMENTS

| 5,086,292 A | 2/1992 | Johnson et al. |
| 5,627,520 A | 5/1997 | Grubbs et al. |

(Continued)

FOREIGN PATENT DOCUMENTS

| CA | 2824514 A1 | 2/2015 |
| CN | 101617325 B | 2/2012 |

(Continued)

OTHER PUBLICATIONS

"Passive Noise Analysis Studies on Tampering Indication"—Baker et al, INL, INMM 56th Annual Meeting, Jul. 2015 https://www.osti.gov/servlets/purl/1360678 (Year: 2015).*

(Continued)

*Primary Examiner* — Randy A Scott

(57) ABSTRACT

A system includes a device including one or more sensors that generate one or more signals used to detect whether an unauthorized activity has occurred at the device. The device is configured to transmit the one or more signals generated by the one or more sensors. The central monitoring device is configured to receive the one or more signals and compare the one or more signals with a baseline signal for the device. The baseline signal includes an expected signal for each of the one or more sensors when the unauthorized activity has not occurred. The monitoring device determines whether the unauthorized activity has occurred based on a result of the comparison.

19 Claims, 3 Drawing Sheets

(51) Int. Cl.
*G06F 21/86* (2013.01)
*G06K 7/00* (2006.01)
*G07F 19/00* (2006.01)
*G06F 21/55* (2013.01)

(52) U.S. Cl.
CPC ....... *G06Q 20/202* (2013.01); *G07F 19/2055* (2013.01)

(56) References Cited

U.S. PATENT DOCUMENTS

| | | | |
|---|---|---|---|
| 5,675,319 | A | 10/1997 | Rivenberg et al. |
| 6,065,679 | A | 5/2000 | Levie et al. |
| 6,175,921 | B1 | 1/2001 | Rosen |
| 6,199,049 | B1 | 3/2001 | Conde et al. |
| 6,566,997 | B1 | 5/2003 | Bradin |
| 6,917,299 | B2 | 7/2005 | Fu et al. |
| 7,287,169 | B2 | 10/2007 | Youssef |
| 7,625,042 | B2 | 11/2009 | Negley, III et al. |
| 7,832,628 | B2 | 11/2010 | Mittler |
| 7,844,837 | B2 | 11/2010 | Youssef |
| 7,898,413 | B2 | 3/2011 | Hsu et al. |
| 7,953,989 | B1 | 5/2011 | Hsiang et al. |
| 8,009,032 | B2 | 8/2011 | Long et al. |
| 8,061,625 | B2 | 11/2011 | Yu et al. |
| 8,358,218 | B2 | 1/2013 | Neo et al. |
| 8,558,685 | B2 | 10/2013 | Long et al. |
| 8,595,514 | B2 | 11/2013 | Mirkazemi-Moud et al. |
| 8,736,286 | B2 | 5/2014 | Johnson, Sr. |
| 8,760,292 | B2 | 6/2014 | Neo et al. |
| 8,786,272 | B2 | 7/2014 | Carapelli et al. |
| 8,819,428 | B2 | 8/2014 | Baig |
| 9,166,586 | B2 | 10/2015 | Carapelli et al. |
| 9,183,381 | B2 | 11/2015 | Morris et al. |
| 9,576,451 | B2 | 2/2017 | Edmonds |
| 9,619,682 | B2 | 4/2017 | Kuehl et al. |
| 9,704,355 | B2 | 7/2017 | Beatty et al. |
| 9,723,710 | B2 | 8/2017 | Woodford et al. |
| 9,779,352 | B1 * | 10/2017 | Hyde ............... A61B 5/4887 |
| 9,881,190 | B2 | 1/2018 | Kuehl et al. |
| 10,066,962 | B2 * | 9/2018 | Svoboda ............ G01D 3/08 |
| 10,115,072 | B2 | 10/2018 | Stokes et al. |
| 10,186,119 | B2 | 1/2019 | Hodges |
| 10,388,118 | B2 | 8/2019 | Hodges |
| 11,257,072 | B1 * | 2/2022 | Aument ............ G06Q 20/3224 |
| 2004/0120101 | A1 | 6/2004 | Cohen et al. |
| 2009/0058628 | A1 | 3/2009 | Kirmayer |
| 2009/0140869 | A1 | 6/2009 | Crockett et al. |
| 2010/0299265 | A1 | 11/2010 | Walters et al. |
| 2010/0318468 | A1 | 12/2010 | Carr et al. |
| 2012/0106113 | A1 | 5/2012 | Kirmayer |
| 2012/0131673 | A1 * | 5/2012 | Caci ............... G06F 21/86 726/23 |
| 2013/0140364 | A1 | 6/2013 | McJones et al. |
| 2014/0204543 | A1 | 7/2014 | Chang et al. |
| 2014/0240137 | A1 | 8/2014 | Neo et al. |
| 2015/0006115 | A1 * | 1/2015 | Svoboda ............ G01D 3/08 702/190 |
| 2016/0314664 | A1 | 10/2016 | Ooi et al. |

FOREIGN PATENT DOCUMENTS

| | | |
|---|---|---|
| EP | 1160647 B1 | 10/2007 |
| EP | 2732396 B1 | 1/2019 |
| WO | 0163994 A3 | 8/2001 |
| WO | 2016086970 A1 | 6/2016 |

OTHER PUBLICATIONS

"Active Time-Domain Reflectometry for Tamper Indication in Unattended Monitoring Systems for Safeguards"—Tedeschi et al, U.S. Dept. of Energy, Dec. 2014 chrome-extension://efaidnbmnn-nibpcajpcglclefindmkaj/https://www.pnnl.gov/main/publications/external/technical_reports/PNNL-23893.pdf (Year: 2014).*

* cited by examiner

DETECTING UNAUTHORIZED ACTIVITY RELATED TO A DEVICE BY MONITORING SIGNALS TRANSMITTED BY THE DEVICE

TECHNICAL FIELD

The present disclosure relates generally to monitoring electronic devices, and more specifically to detecting unauthorized activity related to a Point of Sale (POS) device based on monitoring signals transmitted by the POS device.

BACKGROUND

Point of sale (POS) terminals allow customers to make payments using a variety of payment instruments such as credit cards, debit cards, smart cards, Automatic Teller Machine (ATM) cards and other touchless payment methods. POS terminals are vulnerable to a variety of attacks designed to steal customer information including card skimming attacks and interception attacks for intercepting payment information transmitted from a POS terminal to a payment center. POS attacks generally include physical tampering of POS terminals. For example, skimming attacks typically include affixing a card skimmer attachment to the POS terminal to read magnetic strips that users slide through a card reader of the POS terminal. Further, keypad overlay devices may be affixed on top of a keypad of the POS terminal to record keypad entries including card Personal Identification Numbers (PIN) as the user types them. Information collected via skimming may be used to produce counterfeit cards. Perpetrators may also connect unauthorized electronic devices to a POS terminal to intercept payment information of customers and to transmit the collected payment information to unauthorized devices owned and operated by the perpetrators. Current approaches to stemming tampering of POS terminals are reactionary after the fact. Detecting whether a POS terminal has been tampered with generally needs physical inspection by a human attendant. Existing video surveillance solutions are not very effective at detecting tampering of POS terminals as cameras are generally not integrated with the POS device and are not correlated with the transactions that occur at the POS device. A further disadvantage of these systems is that a high angle of view of the cameras makes their line of sight easy to obstruct.

SUMMARY

The system and methods implemented by the system as disclosed in the present disclosure provide technical solutions to the technical problems faced by current technology by, among other things, detecting unauthorized activities at a POS device including tampering of the POS device to steal user information. The disclosed system and methods provide several practical applications and advantages.

For example, the system and methods disclosed herein can be used to monitor and detect unauthorized activities at a POS device. One or more sensors provided in the POS device is used to detect a physical property and generate one or more signals based on the detection. The one or more signals is compared to a baseline signal to detect whether an unauthorized activity has occurred at the POS device.

In one or more aspects, a POS device is provided with one or more sensors, wherein each sensor is used to detect whether an unauthorized activity has occurred at the POS device. The unauthorized activity may include one or more of unauthorized access to an internal circuitry of the POS device by unauthorized opening of a removable cover piece of the POS device, unauthorized installation of an overlay device covering at least an exterior portion of the POS device and unauthorized connection of an electronic device to the POS device. Each sensor senses a property indicative of an unauthorized activity related to the POS device and generates a signal based on the sensed property. For example, the one or more sensors may include a trip switch installed on an external cover piece of the POS device, where the cover piece is removable to provide access to at least a portion of the internal circuitry of the POS device. The trip switch senses whether the cover piece was removed and generates a binary signal based on whether the cover piece was removed. Additionally or alternatively, the one or more sensors may include a photodetector installed on an external surface of the POS device. The photodetector detects presence of an unauthorized overlay device (e.g., a keypad overlay device, a card reader overlay device) positioned over and covering at least a portion of the external surface of the POS device based on an amount of light incident on the photodetector blocked by the unauthorized device. The photodetector generates a signal based on the amount of light detected by the photodetector. The POS device is configured to transmit the signal generated by the one or more sensors of the POS device.

A central monitoring device receives the signal generated by the one or more sensors, compares the signal with a baseline signal for the POS device, and determines whether the unauthorized activity has occurred based on a result of the comparison. In one or more aspects, the baseline signal includes an expected baseline signal for each of the one or more sensors when the unauthorized activity has not occurred.

Additional mechanisms are provided to detect whether an unauthorized activity has occurred at the POS device. In one or more aspects, an electromagnetic sensing device is provided that detects an electromagnetic signal emitted by the POS device and transmits the detected electromagnetic signal to the central monitoring device. The central monitoring device is configured to compare the detected electromagnetic signal with an electromagnetic signature of the POS device, wherein the electromagnetic signature comprises one or more expected electromagnetic signals emitted by the POS device when unauthorized activity has not occurred at the POS device. The central monitoring device is configured to detect when the detected electromagnetic signal deviates from the electromagnetic signature of the POS device, and in response, determine that the unauthorized activity has occurred at the POS device.

Further mechanisms are provided to detect whether an unauthorized activity has occurred at the POS device. In one or more aspects, a voltmeter is provided at the POS device for measuring a voltage associated with the POS device. The POS device is configured to transmit the measured voltage to the central monitoring device. The central monitoring device is configured to receive the measured voltage and compare the measured voltage with an expected voltage associated with the POS device. The central monitoring device determines that an unauthorized electronic device has been connected to the internal circuitry of the POS device when the measured voltage does not match the expected voltage.

By monitoring signals transmitted by the POS device and detecting irregularities in the monitored signals, the disclosed systems and methods promptly detect tampering of the POS device. For example, the disclosed system and methods can detect any unauthorized changes made to a POS device quicker than existing approaches to detect tampering of POS devices. In fact, systems and methods disclosed herein allow detection of any changes made to the POS device as soon as the change is implemented or when an unauthorized device connected to the POS device starts operating. Early detection of unauthorized devices such as card skimmers and keypad overlays and card reader overlays allow prompt removal of these unauthorized devices and saves valuable user data from being stolen.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
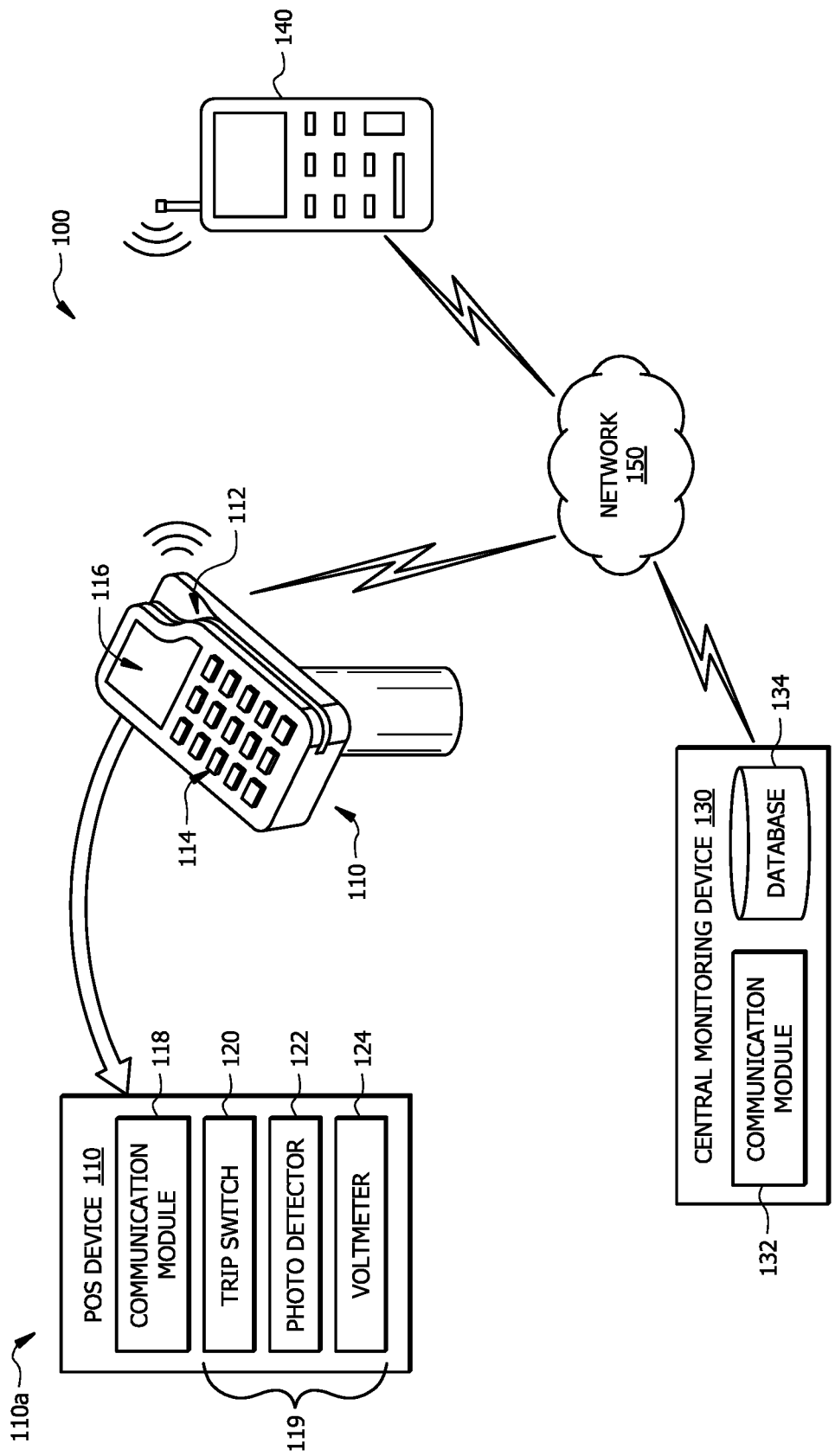
FIG. 1 is a schematic diagram of a system for detecting unauthorized activity related to a Point of Sale (POS) device, in accordance with certain embodiments of the present disclosure.

FIG. 1 is a schematic diagram of a system 100 for detecting unauthorized activity related to a POS device, in accordance with certain embodiments of the present disclosure.

As shown, system 100 includes a POS device/terminal 110, a central monitoring device 130 and an electromagnetic (EM) sensing device 140 communicatively coupled with each other via a network 150. View 110a shows the internal components of the POS device 110 relevant to the following discussion. The POS device 110 may be used at a number of businesses including, but not limited to, grocery stores, gas stations, home improvement stores, clothing stores and restaurants to allow users to make payments using a variety of payment instruments such as credit cards, debit cards, smart cards, Automatic Teller Machine (ATM) cards and other touchless payment methods. The POS device 110 may include a card reader 112 that captures account information stored on a magnetic stripe on the back of a credit card or an ATM/debit card. The POS device 110 may additionally include a keypad 114 having a number of buttons with alphanumeric characters and some additional buttons such as "ENTER", "CLEAR" and "CANCEL" allowing the user to enter a PIN associated with an ATM/debit or credit card, a zip code associated with a credit card and/or other information that needs to be entered by the user to complete a payment transaction. The POS device 110 may also include a display screen 116 providing a visual interface for communicating with the user. To perform a payment transaction, a user of the POS device 110 slides a card through the card reader 112. The transaction details are then displayed to the user on the display 116. The user can then enter additional information regarding the transaction, such as a security verification code or a PIN number via keypad 114. The information entered by the user is encrypted and transmitted through a secure communication channel to a bank or other transaction clearinghouse. Once the transaction is approved, the user is notified via the display 116.

POS devices such as POS device 110 are vulnerable to a variety of attacks designed to steal user information. These attacks include card skimming attacks and data interception attacks for intercepting payment information transmitted from a POS device to a payment center. POS attacks generally include physical tampering of POS devices. For example, skimming attacks typically include using a card skimmer attachment to read magnetic strips that users slide through a card reader (e.g., card reader 112) of the POS device. Further, keypad overlay devices may be affixed on top of a keypad (e.g., 114) of the POS device to record keypad entries including card Personal Identification Numbers (PIN) as the user types them. Information collected via skimming may be used to produce counterfeit cards. Perpetrators may also connect unauthorized electronic devices to a POS device to intercept payment information of customers and to transmit the collected payment information to unauthorized devices owned and operated by the perpetrators.

Aspects of the present disclosure describe techniques for detecting unauthorized activity associated with a POS device (e.g., POS device 110) by monitoring signals transmitted by the POS device and comparing the monitored signals to a baseline signal of the POS device to determine whether unauthorized activity has occurred at the POS device. Unauthorized activity may include physical tampering of the POS device such as unauthorized opening of a removable cover piece of the POS device to access an internal circuitry of the POS device, unauthorized installation of an overlay device covering at least an exterior portion of the POS device and unauthorized connection of an electronic device to the POS device.

View 110a shows the internal components of the POS device 110 relevant to the following discussion. In one or more aspects, the POS device 110 may include one or more sensors, wherein each sensor is used to detect a specific type of unauthorized activity or tampering of the POS device 110. As shown in view 110a, the POS device 110 includes a plurality of sensors 119 including a trip switch 120, a photodetector 122 and a voltmeter 124. Each of the sensors 119 detects a physical property indicative of one or more unauthorized activities or types of tampering and generates a signal based on the detection. For example, each sensor 119 generates an electrical signal based on the physical property detected by the sensor 119. In most cases, the POS device 110 or the sensor 119 itself includes circuitry or logic to interpret the electrical signal and generate digital data based on the interpreted electrical signal. For example, a sensor 119 may interpret an electrical signal that equals or exceeds a threshold current as logic '1' and may interpret an electrical signal that is below the threshold current as logic '0', or vice versa. The POS device 110 may be configured to transmit the signals generated by the sensors 119. For example, the POS device may transmit the digital data generated by the one or more of the sensors 119. In some cases, the POS device 110 or the one or more sensors 119 at the POS device 110 may not have the capability to interpret the electrical signal generated by the sensor 119 into digital data. In such cases, the POS device 110 may transmit electrical signals generated by one or more sensors 119, instead of transmitting digital data (e.g., binary data including logic '0' and '1') interpreted from the electrical signals.

Trip switch 120 may be installed on a removable cover piece or a door of the POS device 110, wherein the removable cover piece or the door may be removed or opened respectively to access at least a portion of the internal circuitry or other internal components of the POS device 110. A perpetrator may remove the cover piece or open the door of the POS device 110 in order to connect one or more unauthorized electronic devices to the internal circuitry, wherein the unauthorized electronic devices intercept and capture user data received by the POS device including information from magnetic strips of payment cards that users swipe through the card reader 112 and information entered by the user using the keypad 114 such as PIN and area zip codes.

The trip switch 120 senses whether the cover piece has been removed or the door has been opened, and generates a binary signal based on the sensing. For example, the trip switch 120 may be installed during manufacturing and assembly of the POS device 110 and set to a logic '0'. The trip switch 120 continues to generate a logic '0' signal as long as the cover piece or the door is not removed or door opened respectively.

The trip switch is designed to trip when the cover piece is removed or door opened and thereafter generate a logic '1' signal indicating that the cover piece has been removed or the door opened. The trip switch 120 may be designed as a one-time trip device which continues to generate a logic '1' signal even after the cover piece or the door is closed. This prevents a perpetrator from resetting the trip switch after connecting an unauthorized device to the internal circuitry of the POS device 110. In an example embodiment, the trip switch 120 may be designed such only authorized personnel can reset the trip switch 120. This allows authorized personnel to access the internal circuitry for servicing the POS device 110 and then reset the trip switch 120 so that any unauthorized opening of the cover piece or door thereafter can be detected and recorded.

One or more photodetectors 122 may be installed on an external surface of the POS device 110. Each photodetector 122 detects an amount of light incident on the photodetector 122 and generates a signal based on the detection. The photodetector 122 may be designed to generate a binary signal based on how much light is detected by the photodetector 122. For example, the photodetector 122 may generate a logic '0' signal when an amount of detected light equals or exceeds a threshold and may generate a logic '1' when the amount of detected light is below the threshold. The photodetector 122 may be used to detect whether an unauthorized overlay device has been affixed to the external surface of the POS device 110, based on an amount of light blocked by the overlay device from reaching the photodetector. For example, one or more photodetectors 122 may be used to detect whether an unauthorized keypad overlay device and/or a card reader overlay device has been affixed to the POS device 110. A photodetector 122 may be positioned over the keypad 144 of the POS device 110 such that placement of an unauthorized keypad overlay device covers at least a portion of the photodetector 122 thus blocking light incident on the photodetector 122. When an unauthorized keypad overlay device is placed on top of the keypad 114, light detected by the photodetector falls below a pre-selected threshold causing the photodetector to generate a logic '1' signal indicating that a keypad overlay device has been affixed to the POS device 110.

Similarly, the presence of a card reader overlay device may be detected by placing a photodetector 122 over a surface of the card reader 112 such that placement of an unauthorized card reader overlay device covers at least a portion of the photodetector 122 thus blocking light incident on the photodetector 122. When an unauthorized card reader overlay device is placed on top of the card reader 112, light detected by the photodetector falls below a pre-selected threshold causing the photodetector to generate a logic '1' signal indicating that a card reader overlay device has been affixed to the POS device 110.

A voltmeter 124 may be used to measure voltages across the POS device 110 or one or more components of the POS device 110. Generally, a voltage drop occurs across the terminals of an electrical or electronic device when current flows through the device. The voltage drop is caused as a result of a decrease in electrical potential along the path of a current flowing in an electrical or electronic circuit of the device. The drop in voltage occurs due to the resistance offered by the electrical or electronic circuit to the flow of current through the device. Any additional circuits added between the terminals of a device adds additional resistance to the flow of current, resulting in an increased voltage drop. On the other hand, if a device is disconnected from the terminals, no voltage drop occurs. Thus, when an unauthorized electronic device is connected to the POS device 110, the voltmeter 124 may measure an increased voltage drop across the POS device 110 as compared to a voltage drop without the unauthorized device connected to the POS device 110. The unauthorized electronic devices that may be connected to the POS device 110 may include, but are not limited to, devices that intercept and capture user information, devices that transmit (e.g., wirelessly) user information to another device and unauthorized overlay devices such as keypad overlay device that draw power from the POS device. Thus, the voltage across the POS device 110 or one or more components may be indicative of whether an unauthorized electronic device has been connected to circuitry of the POS device. The POS device 110 may be configured to transmit the voltage across the POS device 110 or a component thereof as measured by the voltmeter 124.

POS device 110 may include a communication module 118 which allows the POS device 110 to communicate with other devices in the system 100. For example, the communication module 118 can transmit signals generated by the trip switch 120, photodetector 122 and the voltmeter 124 using one or more wireless protocols or a wired connection supported by the communication module 118. The communication module 118 may include a wired interface. For example, in certain embodiments, communication module 118 may include, but is not limited to, one or more of a universal serial bus, Ethernet, FireWire, Thunderbolt, RS-232, or similar interface. Instead of or in addition to a wired interface, communication module 118 may include a wireless interface for communicating with another device. Such wireless interfaces may include, but are not limited to, Bluetooth, Wi-Fi, and ZigBee interfaces. In one or more aspect, communication module 118 may be configured to connect the POS device 110 directly to another device of system 100. Communication module 118 may also be configured to connect POS device 110 to other devices of system 100 over a computer network (e.g., network 150). The network 150, in general, may be a wide area network (WAN), personal area network (PAN), a cellular network, or any other technology that allows devices to communicate electronically with other devices. In one or more embodiments, the network 150 may be the internet.

In one or more aspects, the communication module 118 transmits signals generated by the trip switch 120, photodetector 122 and the voltmeter 124 continuously, periodically or according to a pre-configured schedule.

As shown in FIG. 1, system 100 may further include a central monitoring device 130 communicatively coupled to the POS device 110 over a network 150. The central monitoring device 130 may be representative of a computing system hosting software application that may be installed and run locally or may be used to access software applications running on a server. The central monitoring device 130 may include mobile computing systems including smart phones, tablet computers, laptop computers, or any other mobile computing devices or systems capable of running software applications and communicating with other devices. The central monitoring device 130 may also include non-mobile computing devices such as desktop computers or other non-mobile computing devices capable of running software applications and communicating with other devices.

As shown the central monitoring device 130 may include a communication module 132 which allows the central monitoring device 130 to exchange signaling and data with other devices (e.g., POS device 110) of system 100. For example, the central monitoring device 130 may receive signaling and data transmitted by the communication module 118 of the POS device 110, including, but not limited to, signals generated by the trip switch 120, photodetector 122 and the voltmeter 124. The communication module 132 may include a wired interface. For example, in certain embodiments, communication module 132 may include, but is not limited to, one or more of a universal serial bus, Ethernet, FireWire, Thunderbolt, RS-232, or similar interface. Instead of or in addition to a wired interface, communication module 132 may include a wireless interface for communicating with another device. Such wireless interfaces may include, but are not limited to, Bluetooth, Wi-Fi, and ZigBee interfaces. In one or more aspect, communication module 132 may be configured to connect the central monitoring device 130 directly to another device of system 100. Communication module 132 may also be configured to connect central monitoring device 130 to other devices of system 100 over a computer network (e.g., network 150).

In one or more aspects, the central monitoring device 130 may compare a signal received from the POS device 110 to a respective baseline signal in order to determine whether an unauthorized activity has occurred at the POS device 110. The baseline signal may include an expected baseline signal for each of the one or more sensors 119 implemented at the POS device 110, wherein an expected baseline signal corresponding to a sensor 119 of the POS device 110 indicates that a respective unauthorized activity has not occurred at the POS device 110. For example, the baseline signal may include a logic '0' signal corresponding to the trip switch 120 of the POS device 110, wherein the logic '0' signal indicates that a cover piece or door of the POS device has not been opened. Similarly, the baseline signal may include a logic '0' signal corresponding to the photodetector 122 of the POS device 110, wherein the logic '0' signal indicates that an unauthorized overlay device has not been affixed to the POS device. The baseline signal may further include a baseline voltage signal for the POS device, wherein the baseline voltage signal indicates that no additional unauthorized electronic devices have been connected to the circuitry of the POS device 110. The central monitoring device 130 may store the baseline signal corresponding to each sensor 119 of the POS device 110 in a database 134.

In an example, the central monitoring device 130 may receive a binary signal from the POS device 110 corresponding to the trip switch 120, and may compare the received binary signal with a respective baseline binary signal for the trip swith 120, for example, as stored in the database 134. Assuming a logic '0' value of the baseline binary signal indicates that the cover piece or door of the POS device has not been opened, the central monitoring device 130 determines that the cover piece or door of the POS device has not been opened when the value of the received binary signal is logic '0'. On the other hand, when the value of the received binary signal is logic '1', the central monitoring device 130 determines that the cover piece or door of the POS device was opened without authorization.

Similarly, the central monitoring device 130 may receive a binary signal from the POS device 110 corresponding to the photodetector 122 and may compare the received binary signal with a respective baseline binary signal for the photodetector 122, for example, as stored in the database 134. Assuming a logic '0' value of the baseline binary signal indicates that an unauthorized overlay device (e.g., keypad overlay device, card reader overlay device etc.) has not been affixed to the POS device, the central monitoring device 130 determines that the unauthorized overlay device has not been affixed to the POS device when the value of the received binary signal is logic '0'. On the other hand, when the value of the received binary signal is logic '1', the central monitoring device 130 determines that the unauthorized overlay device was affixed to the POS device without authorization.

In one or more aspects, light incident on the photodetector 122 may be temporarily blocked when a user is using the POS device 110 for a payment transaction. For example, a photodetector 122 placed on the keypad 114 may temporarily detect reduced light when the user uses the keypad 114 to complete a payment transaction. Similarly, a photodetector 122 placed on the card reader 112 may temporarily detect reduced light when the user swipes a payment card through the card reader 112. Thus, in an example embodiment, the central monitoring device 130 may be configured to detect that a keypad overlay device or a card reader overlay device has been affixed to the POS device 110 when the signal from the respective photodetector stays at a logic '1' for a pre-selected time period. The pre-selected time period may be chosen as the typical time taken by users to complete payment transactions at the POS device. This allows the central monitoring device 130 to avoid false detection of unauthorized overlay devices during routine usage of the POS device 110. In one example, in order to keep false detections of unauthorized overlay devices from occurring, the pre-selected time period may be selected higher than a maximum amount of time that a user may take for a payment transaction. For example, the pre-selected time period may be set to a few minutes or more.

In another example, the central monitoring device 130 may receive a voltage across the POS device 110 or a component of the POS device 110 as measured by the voltmeter 124. The central monitoring device 130 may compare the measured voltage received from the POS device 110 with an expected voltage profile of the POS device 110. The expected voltage profile of the POS device 110 may include one or more expected voltage values associated with normal authorized operation of the POS device 110. Essentially, the voltage profile of a POS device 110 includes substantially all possible voltage values that may be detected across the device terminals during authorized operation of the POS device 110 including operational exceptions such as voltage changes as a result of device overheating, triggering of optional circuits and devices such as a cooling fan, circuit breakers, safety fuses and the like. The expected voltage profile may be stored in the database 134.

The central monitoring device 130 is configured to detect any voltage irregularities as compared to the expected voltage profile of the POS device 110. The central monitoring device 130 compares each voltage value measured across the terminals of a POS device 110 and compares the measured voltage with expected voltage values in the voltage profile of the device. If the measured voltage does not match any of the expected voltage values for the device, the central monitoring device 130 may determine that an unauthorized change has been made to the POS device 110. The unauthorized change may include, but is not limited to, addition of an unauthorized device or circuitry to the POS device 110, modifying the internal circuitry of the POS device 110 and disconnecting a device or circuit from the POS device. In one or more aspects, the central monitoring device 130 may determine that an unauthorized change has been made to the POS device 110 when the measured voltage of the device deviates from the expected voltage profile of the POS device 110 by a minimum threshold voltage. This keeps false positives from occurring and ensures that minor voltage spikes as a result of power fluctuations are accounted for.

In one or more aspects, the central monitoring device 130 may detect presence of unauthorized electronic devices connected to the POS device 110 based on an electromagnetic signal emitted by the POS device 110. The unauthorized electronic devices may include, but are not limited to, devices that intercept and capture user information, devices that transmit (e.g., wirelessly) user information to another device and unauthorized overlay devices such as keypad overlay device that draw power from the POS device. Every electrical and electronic device generally emits a unique electromagnetic signal based on the construction of electrical components used in the device, the arrangement of and connection between the components, power consumption etc. The unique electromagnetic signal emitted by an electronic device may be referred to as the electromagnetic signature of the electronic device. In one example, the electromagnetic signature of a device may include signals at particular frequencies, at particular amplitudes and at particular power levels. Electronic devices manufactured similarly using similar components having similar construction typically have the same or substantially the same electromagnetic signature. The central monitoring device 130 may store the electromagnetic signature of the POS device 110 in a database 134. Connecting additional devices to the electrical circuitry of the POS device changes one or more properties of the electromagnetic signals emitted by the POS device 110. For example, an unauthorized electronic device connected to the POS device 110 may change one or more frequencies at which the signal is emitted, may change a power level of the emitted signal and/or change a waveform of the emitted signal. Thus, comparing the electromagnetic signals emitted by the POS device 110 with its certified electromagnetic signature may indicate whether an unauthorized device has been connected to the POS device 110.

As shown in FIG. 1, system 100 may include an electromagnetic (EM) sensing device 140 which can detect and record electromagnetic signals emitted by the POS device 110. The EM sensing device 140 may transmit the electromagnetic signals detected from the POS device 110 to the central monitoring device 130, for example, over the network 150 or via a direct connection with the central monitoring device 130. It may be noted the EM sensing device 140 may connect to the central monitoring device 130 over a wireless interface or a wired interface. For example, when the network 150 is a Wi-Fi network, the EM sensing device 140 and the central monitoring device 130 may connect to the Wi-Fi network and communicate wirelessly with each other. In one example, one or both of the EM sensing device 140 and the central monitoring device 130 may connect to the network 150 using a wired connection. A direct connection between the EM sensing device 140 and the central monitoring device 130 may be a direct wireless connection (e.g., over Bluetooth interface) and/or a direct wired connection (e.g., using a USB interface).

The central monitoring device 130 may receive the electromagnetic signal transmitted by the EM sensing device 140. The central monitoring device 130 may compare the received electromagnetic signal of the POS device 110 with the electromagnetic signature of the POS device 110, for example, as stored in the database 134. The electromagnetic signature of the POS device 110 as stored in the database 134 may include one or more electromagnetic signals expected to be emitted by the POS device 110 when an unauthorized activity has not occurred at the POS device 110. The central monitoring device 130 may determine whether an unauthorized device has been connected to the circuitry of the POS device 110, based on the comparison. For example, the central monitoring device 130 determines that an unauthorized device has been connected to the POS device 110 in response to detecting that the electromagnetic signal of the POS device 110 as detected by the EM sensing device 140 deviates from the electromagnetic signature of the POS device 110. The central monitoring device 130 may determine that the detected electromagnetic signal of the POS device 110 deviates from the electromagnetic signature of the POS device 110 when a frequency in the detected electromagnetic signal is not part of the electromagnetic signature, when a power level of the detected electromagnetic signal does not match with an expected power level of the electromagnetic signature and/or when a waveform of the detected electromagnetic signal does not match a respective waveform of the electromagnetic signature.

In an example embodiment, the electromagnetic signal detected by the EM sensing device 140 may include a transmission signal transmitting data out of the POS device 110. For example, the transmission signal may be generated by an unauthorized transmitting device that transmits out user information tapped at the POS device 110. Presence of such unauthorized transmission signal indicates that an unauthorized transmission device has been connected to the POS device 110. In this context, the central monitoring device 130 receives the transmission signal from the EM sensing device 140 and compares the transmission signal to the electromagnetic signature of the POS device 110. Since the transmission signal is not an expected signal, a corresponding signal does not exist in the electromagnetic signature of the POS device. In response, the central monitoring device 130 determines that an unauthorized transmission device has been connected to the POS device. The unauthorized transmission signal may include, but is not limited to, a Wi-Fi signal and a Bluetooth signal.

In one or more aspects, the EM sensing device 140 may be implemented as a peripheral attachment to a smartphone, wherein the electromagnetic signals detected by the EM sensing device 140 are transmitted to the central monitoring device 130 using communication capabilities of the smartphone.

The central monitoring device 130 may be configured to perform one or more actions in response to detecting that an unauthorized activity has occurred at the POS device 110. The actions may include, but are not limited to, transmitting a signal to the POS device 110 to cease all operations of the POS device 110 and/or power down the POS device 110, trigger an audible alarm in the vicinity of the POS device, and send out a signal to security and/or law enforcement authorities.

Figure 2:
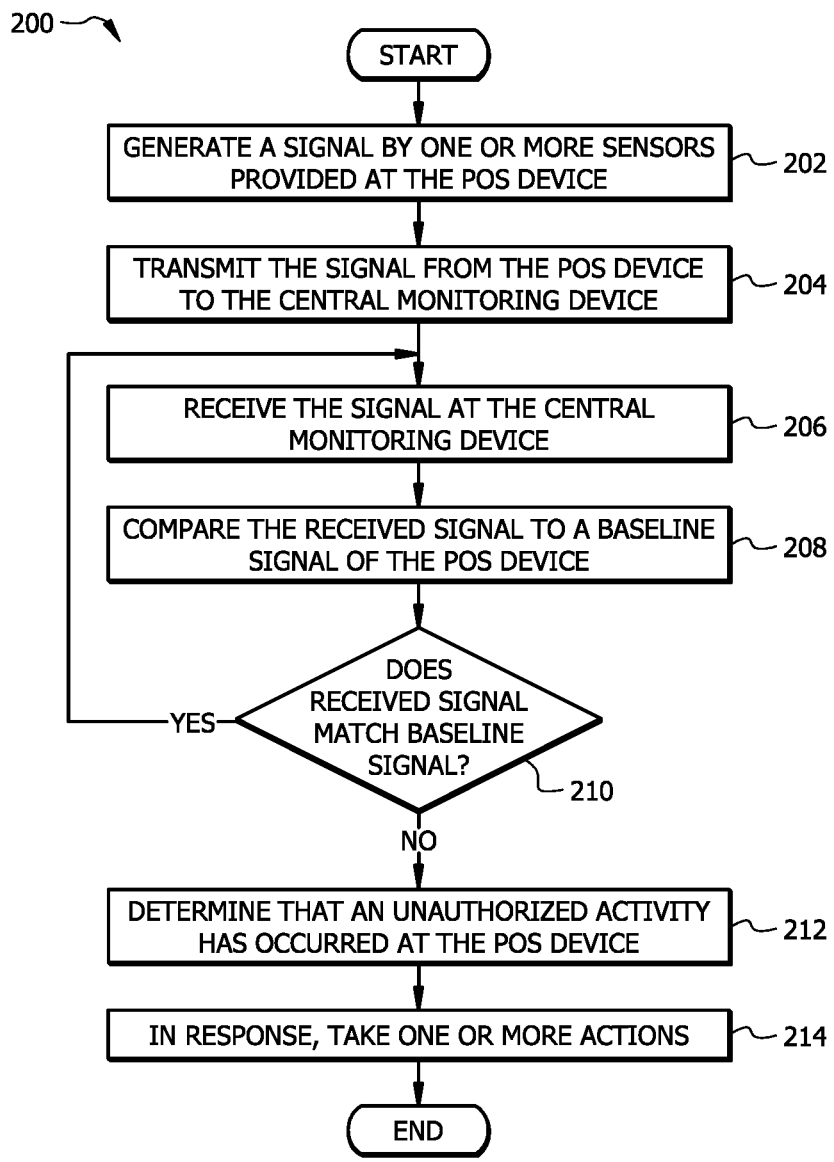
FIG. 2 illustrates a flowchart of an example method for detecting unauthorized activity at a POS device, in accordance with certain embodiments of the present disclosure.

FIG. 2 illustrates a flowchart of an example method 200 for detecting unauthorized activity at a device (e.g., POS device 110), in accordance with certain embodiments of the present disclosure.

Method 200 begins at step 202 by generating a signal by one or more sensors 119 provided at the POS devices 110. As described above, the POS device 110 may be used at a number of businesses including, but not limited to, grocery stores, gas stations, home improvement stores, clothing stores and restaurants to allow users to make payments using a variety of payment instruments such as credit cards, debit cards, smart cards, Automatic Teller Machine (ATM) cards and other touchless payment methods.

The POS device 110 may include one or more sensors 119, wherein each sensor 119 is used to detect a specific type of unauthorized activity or tampering of the POS device 110. Examples of unauthorized activity may include, but is not limited to, unauthorized access to an internal circuitry of the POS device, unauthorized installation of an overlay device covering at least an exterior portion of the POS device and unauthorized connection of an electronic device to the POS device. For example, the POS device 110 includes a plurality of sensors 119 including a trip switch 120, a photodetector 122 and a voltmeter 124. Each of the sensors 119 detects a physical property indicative of one or more unauthorized activities or types of tampering and generates a signal based on the detection.

For example, trip switch 120 may be installed on a removable cover piece or a door of the POS device 110, wherein the removable cover piece or the door may be removed or opened respectively to access at least a portion of the internal circuitry or other internal components of the POS device 110. A perpetrator may remove the cover piece or open the door of the POS device 110 in order to connect one or more unauthorized electronic devices to the internal circuitry, wherein the unauthorized electronic devices intercept and capture user data received by the POS device including information from magnetic strips of payment cards that users swipe through the card reader 112 and information entered by the user using the keypad 114 such as PIN and area zip codes.

The trip switch 120 senses whether the cover piece has been removed or the door has been opened, and generates a binary signal based on the sensing. For example, the trip switch 120 may be installed during manufacturing and assembly of the POS device 110 and set to a logic '0'. The trip switch 120 continues to generate a logic '0' signal as long as the cover piece or the door is not removed or door opened respectively. The trip switch is designed to trip when the cover piece is removed or door opened and thereafter generate a logic '1' signal indicating that the cover piece has been removed or the door opened. The trip switch 120 may be designed as a one-time trip device which continues to generate a logic '1' signal even after the cover piece or the door is closed. This prevents a perpetrator from resetting the trip switch after connecting an unauthorized device to the internal circuitry of the POS device 110. In an example embodiment, the trip switch 120 may be designed such only authorized personnel can reset the trip switch 120. This allows authorized personnel to access the internal circuitry for servicing the POS device 110 and then reset the trip switch 120 so that any unauthorized opening of the cover piece or door thereafter can be detected and recorded.

In another example, one or more photodetectors 122 may be installed on an external surface of the POS device 110. Each photodetector 122 detects an amount of light incident on the photodetector 122 and generates a signal based on the detection. The photodetector 122 may be designed to generate a binary signal based on how much light is detected by the photodetector 122. For example, the photodetector 122 may generate a logic '0' signal when an amount of detected light equals or exceeds a threshold and may generate a logic '1' when the amount of detected light is below the threshold. The photodetector 122 may be used to detect whether an unauthorized overlay device has been affixed to the external surface of the POS device 110, based on an amount of light blocked by the overlay device from reaching the photodetector. For example, one or more photodetectors 122 may be used to detect whether an unauthorized keypad overlay device and/or a card reader overlay device has been affixed to the POS device 110. A photodetector 122 may be positioned over the keypad 144 of the POS device 110 such that placement of an unauthorized keypad overlay device covers at least a portion of the photodetector 122 thus blocking light incident on the photodetector 122. When an unauthorized keypad overlay device is placed on top of the keypad 114, light detected by the photodetector falls below a pre-selected threshold causing the photodetector to generate a logic '1' signal indicating that a keypad overlay device has been affixed to the POS device 110.

Similarly, the presence of a card reader overlay device may be detected by placing a photodetector 122 over a surface of the card reader 112 such that placement of an unauthorized card reader overlay device covers at least a portion of the photodetector 122 thus blocking light incident on the photodetector 122. When an unauthorized card reader overlay device is placed on top of the card reader 112, light detected by the photodetector falls below a pre-selected threshold causing the photodetector to generate a logic '1' signal indicating that a card reader overlay device has been affixed to the POS device 110.

In another example, a voltmeter 124 may be used to measure voltages across the POS device 110 or one or more components of the POS device 110. Generally, a voltage drop occurs across the terminals of an electrical or electronic device when current flows through the device. The voltage drop is caused as a result of a decrease in electrical potential along the path of a current flowing in an electrical or electronic circuit of the device. The drop in voltage occurs due to the resistance offered by the electrical or electronic circuit to the flow of current through the device. Any additional circuits added between the terminals of a device adds additional resistance to the flow of current, resulting in an increased voltage drop. On the other hand, if a device is disconnected from the terminals, no voltage drop occurs. Thus, when an unauthorized electronic device is connected to the POS device 110, the voltmeter 124 may measure an increased voltage drop across the POS device 110 as compared to a voltage drop without the unauthorized device connected to the POS device 110. The unauthorized electronic devices that may be connected to the POS device 110 may include, but are not limited to, devices that intercept and capture user information, devices that transmit (e.g., wirelessly) user information to another device and unauthorized overlay devices such as keypad overlay device that draw power from the POS device. Thus, the voltage across the POS device 110 or one or more components may be indicative of whether an unauthorized electronic device has been connected to circuitry of the POS device. The signal generated by the voltmeter may include the voltage measured across the POS device or a component thereof.

At step 204, the POS device 110 transmits the signal generated by the one or more sensors 119 to the central monitoring device 130. The POS device 110 may include a communication module 118 which allows the POS device 110 to communicate with other devices in the system 100 including the central monitoring device 130. For example, the POS device 110 may use the communication module 118 to transmit signals generated by the trip switch 120, photodetector 122 and the voltmeter 124 using one or more wireless protocols or a wired connection supported by the communication module 118.

At step 206, the central monitoring device 130 receives the signal transmitted by the POS device 110. The central monitoring device 130 may include a communication module 132 which allows the central monitoring device 130 to exchange signaling and data with other devices of system 100 including the POS device 110. For example, the central monitoring device 130 may receive signaling and data transmitted by the communication module 118 of the POS device 110, including, but not limited to, signals generated by the trip switch 120, photodetector 122 and the voltmeter 124.

At step 208, the central monitoring device 130 compares the signal received from the POS device 110 to a baseline signal of the POS device.

In one or more aspects, the central monitoring device 130 may compare a signal received from the POS device 110 to a respective baseline signal in order to determine whether an unauthorized activity has occurred at the POS device 110. The baseline signal may include an expected baseline signal for each of the one or more sensors 119 implemented at the POS device 110, wherein an expected baseline signal corresponding to a sensor 119 of the POS device 110 indicates that a respective unauthorized activity has not occurred at the POS device 110. For example, the baseline signal may include a logic '0' signal corresponding to the trip switch 120 of the POS device 110, wherein the logic '0' signal indicates that a cover piece or door of the POS device has not been opened. Similarly, the baseline signal may include a logic '0' signal corresponding to the photodetector 122 of the POS device 110, wherein the logic '0' signal indicates that an unauthorized overlay device has not been affixed to the POS device. The baseline signal may further include a baseline voltage signal for the POS device, wherein the baseline voltage signal indicates that no additional unauthorized electronic devices have been connected to the circuitry of the POS device 110. The central monitoring device 130 may store the baseline signal corresponding to each sensor 119 of the POS device 110 in a database 134.

At step 210, the central monitoring device 130 determines whether the signal received from the POS device 110 matches the corresponding baseline signal of the POS device 110. If the received signal does not match the baseline signal, method 200 proceeds to step 212 where the central monitoring device 130 determines that an unauthorized activity has occurred at the POS device. On the other hand, if the received signal matches with the baseline signal, the central monitoring device 130 determines that no unauthorized activity occurred at the POS device, and continues to monitor and process subsequent signals received from the POS device 110.

In one example, the central monitoring device 130 may receive a binary signal from the POS device 110 corresponding to the trip switch 120, and may compare the received binary signal with a respective baseline binary signal for the trip switch 120, for example, as stored in the database 134. Assuming a logic '0' value of the baseline binary signal indicates that the cover piece or door of the POS device has not been opened, the central monitoring device 130 determines that the cover piece or door of the POS device has not been opened when the value of the received binary signal is logic '0'. On the other hand, when the value of the received binary signal is logic '1', the central monitoring device 130 determines that the cover piece or door of the POS device was opened without authorization.

In another example, the central monitoring device 130 may receive a binary signal from the POS device 110 corresponding to the photodetector 122 and may compare the received binary signal with a respective baseline binary signal for the photodetector 122, for example, as stored in the database 134. Assuming a logic '0' value of the baseline binary signal indicates that an unauthorized overlay device (e.g., keypad overlay device, card reader overlay device etc.) has not been affixed to the POS device, the central monitoring device 130 determines that the unauthorized overlay device has not been affixed to the POS device when the value of the received binary signal is logic '0'. On the other hand, when the value of the received binary signal is logic '1', the central monitoring device 130 determines that the unauthorized overlay device was affixed to the POS device without authorization.

In another example, the central monitoring device 130 may receive a voltage signal including information relating to a voltage across the POS device 110 or a component of the POS device 110 as measured by the voltmeter 124. The central monitoring device 130 may compare the measured voltage received from the POS device 110 with an expected voltage profile of the POS device 110. The expected voltage profile of the POS device 110 may include one or more expected voltage values associated with normal authorized operation of the POS device 110. Essentially, the voltage profile of a POS device 110 includes substantially all possible voltage values that may be detected across the device terminals during authorized operation of the POS device 110 including operational exceptions such as voltage changes as a result of device overheating, triggering of optional circuits and devices such as a cooling fan, circuit breakers, safety fuses and the like. The expected voltage profile may be stored in the database 134.

The central monitoring device 130 is configured to detect any voltage irregularities as compared to the expected voltage profile of the POS device 110. The central monitoring device 130 compares each voltage value measured across the terminals of a POS device 110 and compares the measured voltage with expected voltage values in the voltage profile of the device. If the measured voltage does not match any of the expected voltage values for the device, the central monitoring device 130 may determine that an unauthorized change has been made to the POS device 110. The unauthorized change may include, but is not limited to, addition of an unauthorized device or circuitry to the POS device 110, modifying the internal circuitry of the POS device 110 and disconnecting a device or circuit from the POS device. In one or more aspects, the central monitoring device 130 may determine that an unauthorized change has been made to the POS device 110 when the measured voltage of the device deviates from the expected voltage profile of the POS device 110 by a minimum threshold voltage. This keeps false positives from occurring and ensures that minor voltage spikes as a result of power fluctuations are accounted for.

At step 214, the central monitoring device 130 may perform one or more actions in response to detecting that an unauthorized activity has occurred at the POS device 110. For example, the central monitoring device 130 may be configured to send out a command to the POS device 110 to cease all operations and/or power down. Additionally or alternatively the central monitoring device 130 may send out an alert and/or information relating to tampering of the POS device 110 to concerned authorities such as security personnel and/or law enforcement.

It may be noted that, the system and methods disclosed herein with reference to FIGS. 1 and 2 may apply to detecting unauthorized activity related to an Automatic Teller Machine (ATM).

Figure 3:
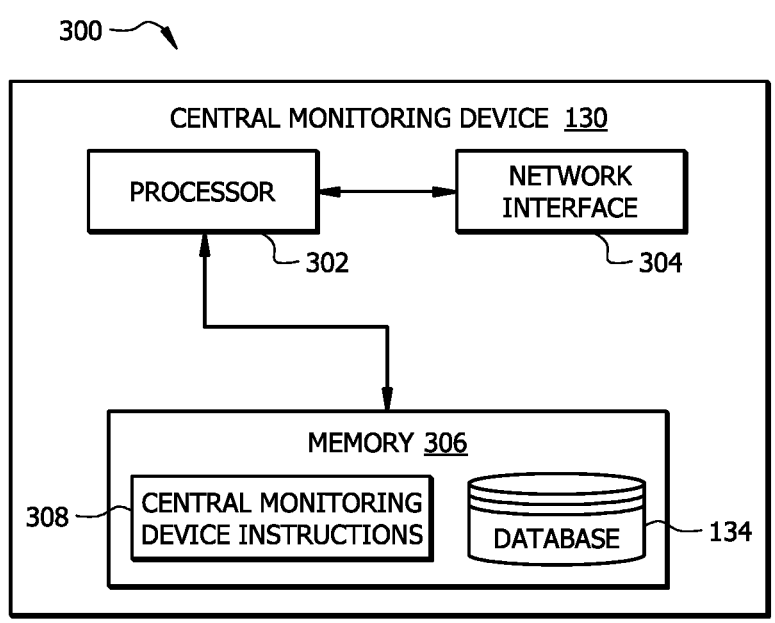
FIG. 3 illustrates an example schematic diagram of the central monitoring device, in accordance with one or more embodiments of the present disclosure.

FIG. 3 illustrates an example schematic diagram of the central monitoring device 130, in accordance with one or more embodiments of the present disclosure.

The central monitoring device 130 comprises a processor 302, a memory 306, and a network interface 304. The central monitoring device 130 may be configured as shown in FIG. 3 or in any other suitable configuration.

The processor 302 comprises one or more processors operably coupled to the memory 306. The processor 302 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 302 may be a programmable logic device, a microcontroller, a microprocessor, or any suitable combination of the preceding. The processor 302 is communicatively coupled to and in signal communication with the memory 306. The one or more processors are configured to process data and may be implemented in hardware or software. For example, the processor 302 may be 8-bit, 16-bit, 32-bit, 64-bit or of any other suitable architecture. The processor 302 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (central monitoring device instructions 308) to implement the central monitoring device 130. In this way, processor 302 may be a special-purpose computer designed to implement the functions disclosed herein of the central monitoring device 130. In one or more embodiments, the central monitoring device 130 is implemented using logic units, FPGAs, ASICs, DSPs, or any other suitable hardware. The central monitoring device 130 is configured to operate as described with reference to FIGS. 1-2. For example, the central monitoring device 130 may be configured to perform at least a portion of the flowchart 200 as described in FIGS. 2, respectively.

The memory 306 comprises one or more disks, tape drives, or solid-state drives, and may be used as an over-flow data storage device, to store programs when such programs are selected for execution, and to store instructions and data that are read during program execution. The memory 306 may be volatile or non-volatile and may comprise a read-only memory (ROM), random-access memory (RAM), ternary content-addressable memory (TCAM), dynamic random-access memory (DRAM), and static random-access memory (SRAM).

The memory 306 is operable to store the central monitoring device instructions 308, database 134 and/or any other data or instructions. The central monitoring device instructions 308 may include any suitable set of instructions, logic, rules, or code operable to execute operations of the central monitoring device 130.

The network interface 304 is configured to enable wired and/or wireless communications. The network interface 304 is configured to communicate data between the central monitoring device 130 and other devices (e.g. POS device 110 and EM sensing device 140), systems, or domains. For example, the network interface 304 may comprise a Wi-Fi interface, a LAN interface, a WAN interface, a modem, a switch, or a router. In one aspect, the network interface 304 includes the communication module 132 of the central monitoring device 130. The processor 302 is configured to send and receive data using the network interface 304. The network interface 304 may be configured to use any suitable type of communication protocol as would be appreciated by one of ordinary skill in the art.

It may be noted that one or more other components shown in FIG. 1 may be implemented by a hardware device having a similar structure to the central monitoring device 130 shown in FIG. 3. For example, one or more of the POS device 110 and EM sensing device 140 may have a similar structure shown in FIG. 3. For example, one or more of these devices may include a network interface to communicate with other devices within the network 150 and a processor operatively coupled to a memory storing instructions which when executed by the processor implement a functionality of the device as described with reference to FIG. 1.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
   a device comprising one or more sensors that generate one or more signals used to detect whether an unauthorized activity has occurred at the device, wherein the unauthorized activity comprises one or more of unauthorized access to an internal circuitry of the device, unauthorized installation of an overlay device covering at least an exterior portion of the device and unauthorized connection of an electronic device to the device, wherein the device is configured to transmit the one or more signals generated by the one or more sensors;

a central monitoring device communicatively coupled to the device and comprising a processor configured to:
receive the one or more signals from the device, wherein the received one or more signals from the device comprises one or more bits of information from the one or more sensors;
compare the one or more signals with a baseline signal for the device, wherein:
the baseline signal includes an expected signal for each of the one or more sensors when the unauthorized activity has not occurred;
the baseline signal of the device includes one or more bits of information;
each bit of the one or more bits of information corresponds to one of the one or more sensors;
the comparing comprises comparing each bit of the received one or more signals to a corresponding bit of the baseline signal; and
determine whether the unauthorized activity has occurred based on a result of the comparison, wherein the determining comprises determining that the unauthorized activity has occurred in response to detecting that values of one or more bits of the received one or more signals does not match with the corresponding one or more bits of the baseline signal.

2. The system of claim 1, further comprising:
an electromagnetic sensing device communicatively coupled to the device and configured to:
detect an electromagnetic signal emitted by the device; and
transmit the detected electromagnetic signal to the central monitoring device;
wherein the processor of the central monitoring device is further configured to:
compare the detected electromagnetic signal with an electromagnetic signature of the device, wherein the electromagnetic signature comprises one or more expected electromagnetic signals emitted by the device when the unauthorized activity has not occurred at the device;
determine that the detected electromagnetic signal deviates from the electromagnetic signature of the device; and
in response, determine that the unauthorized activity has occurred.

3. The system of claim 2, wherein determining that the detected electromagnetic signal deviates from the electromagnetic signature comprises one or more of:
detecting that a frequency in the detected electromagnetic signal is not part of the electromagnetic signature;
detecting that a power level of the detected electromagnetic signal does not match with an expected power level of the electromagnetic signature; and
detecting that a waveform of the detected electromagnetic signal does not match a respective waveform of the electromagnetic signature.

4. The system of claim 2, wherein the detected electromagnetic signal emitted by the device comprises a transmission signal transmitting data to another device.

5. The system of claim 1, wherein:
the one or more sensors comprises a trip switch installed on an external cover piece of the device, the cover piece being removable to provide access to at least a portion of the internal circuitry of the device;
the trip switch generates a binary signal and changes a logic state of the binary signal in response to detecting that the cover piece of the device has been removed; and
the one or more signals transmitted by the device includes the binary signal generated by the trip switch.

6. The system of claim 1, wherein:
the one or more sensors comprises a photodetector installed on an external surface of the device;
the photodetector detects presence of an unauthorized device positioned over and covering at least a portion of the external surface of the device based on an amount of light incident on the photodetector blocked by the unauthorized device;
the photodetector generates a signal based on the amount of light detected by the photodetector; and
the one or more signals transmitted by the device includes the signal generated by the photodetector.

7. The system of claim 6, wherein the unauthorized device comprises one or more of a keypad overlay device and a card reader device.

8. The system of claim 1, wherein:
the one or more sensors comprises a voltmeter for measuring a voltage associated with the device;
the one or more signals transmitted by the device includes the voltage measured by the voltmeter; and
the baseline signal includes an expected voltage for the device;
wherein the processor of the central monitoring device is configured to:
detect that measured voltage does not match the expected voltage; and
in response, determine the unauthorized connection of an electronic device to the internal circuitry of the device.

9. The system of claim 1, wherein the device comprises a Point of Sale (POS) device or an Automatic Teller Machine (ATM).

10. A method for detecting unauthorized activity associated with a device, comprising:
generating one or more signals by one or more sensors provided at the device, wherein each of the one or more sensors is used to detect whether an unauthorized activity has occurred at the device, wherein the unauthorized activity comprises one or more of unauthorized access to an internal circuitry of the device, unauthorized installation of an overlay device covering at least an exterior portion of the device and unauthorized connection of an electronic device to the device, wherein the one or more signals comprises one or more bits of information from the one or more sensors;
comparing the one or more signals with a baseline signal for the device, wherein:
the baseline signal includes an expected signal for each of the one or more sensors when the unauthorized activity has not occurred;
the baseline signal of the device includes one or more bits of information;
each bit of the one or more bits of information corresponds to one of the one or more sensors;
the comparing comprises comparing each bit of the received one or more signals to a corresponding bit of the baseline signal; and determining whether the unauthorized activity has occurred based on a result of the comparison, wherein the determining comprises determining that the unauthorized activity has occurred in response to detecting that values of one or more bits of the received one or more signals does not match with the corresponding one or more bits of the baseline signal.

11. The method of claim 10, further comprising:
detecting an electromagnetic signal emitted by the device;
comparing the detected electromagnetic signal with an electromagnetic signature of the device, wherein the electromagnetic signature comprises one or more expected electromagnetic signals emitted by the device when the unauthorized activity has not occurred at the device;
determining that the detected electromagnetic signal deviates from the electromagnetic signature of the device; and
in response, determining that the unauthorized activity has occurred.

12. The method of claim 11, wherein determining that the detected electromagnetic signal deviates from the electromagnetic signature comprises one or more of:
detecting that a frequency in the detected electromagnetic signal is not part of the electromagnetic signature;
detecting that a power level of the detected electromagnetic signal does not match with an expected power level of the electromagnetic signature; and
detecting that a waveform of the detected electromagnetic signal does not match a respective waveform of the electromagnetic signature.

13. The method of claim 10, wherein:
the one or more sensors comprises a trip switch installed on an external cover piece of the device, the cover piece being removable to provide access to at least a portion of the internal circuitry of the device; and
the trip switch generates a binary signal and changes a logic state of the binary signal in response to detecting that the cover piece of the device has been removed.

14. The method of claim 10, wherein:
the one or more sensors comprises a photodetector installed on an external surface of the device;
the photodetector detects presence of an unauthorized device positioned over and covering at least a portion of the external surface of the device based on an amount of light incident on the photodetector blocked by the unauthorized device; and
the photodetector generates a signal based on the amount of light detected by the photodetector.

15. The method of claim 10, wherein:
the one or more sensors comprises a voltmeter for measuring a voltage associated with the device;
the signal generated by the voltmeter includes information relating to the voltage measured by the voltmeter; and
the baseline signal includes an expected voltage for the device;
further comprising:
detecting that measured voltage does not match the expected voltage; and
in response, determining the unauthorized connection of an electronic device to the internal circuitry of the device.

16. A non-transitory computer-readable medium storing instructions that when executed by a processor cause the processor to:
generate one or more signals by one or more sensors provided at the device, wherein each of the one or more sensors is used to detect whether an unauthorized activity has occurred at the device, wherein the unauthorized activity comprises one or more of unauthorized access to an internal circuitry of the device, unauthorized installation of an overlay device covering at least an exterior portion of the device and unauthorized connection of an electronic device to the device, wherein the one or more signals comprises one or more bits of information from the one or more sensors;
compare the one or more signals with a baseline signal for the device, wherein:
the baseline signal includes an expected signal for each of the one or more sensors when the unauthorized activity has not occurred;
the baseline signal of the device includes one or more bits of information;
each bit of the one or more bits of information corresponds to one of the one or more sensors;
the comparing comprises comparing each bit of the received one or more signals to a corresponding bit of the baseline signal; and
determine whether the unauthorized activity has occurred based on a result of the comparison, wherein the determining comprises determining that the unauthorized activity has occurred in response to detecting that values of one or more bits of the received one or more signals does not match with the corresponding one or more bits of the baseline signal.

17. The non-transitory computer-readable medium of claim 16, wherein the instructions further cause the processor to:
detect an electromagnetic signal emitted by the device;
compare the detected electromagnetic signal with an electromagnetic signature of the device, wherein the electromagnetic signature comprises one or more expected electromagnetic signals emitted by the device when the unauthorized activity has not occurred at the device;
determine that the detected electromagnetic signal deviates from the electromagnetic signature of the device; and
in response, determine that the unauthorized activity has occurred.

18. The non-transitory computer-readable medium of claim 7, wherein determining that the detected electromagnetic signal deviates from the electromagnetic signature comprises one or more of:
detecting that a frequency in the detected electromagnetic signal is not part of the electromagnetic signature;
detecting that a power level of the detected electromagnetic signal does not match with an expected power level of the electromagnetic signature; and
detecting that a waveform of the detected electromagnetic signal does not match a respective waveform of the electromagnetic signature.

19. The non-transitory computer-readable medium of claim 16, wherein:
the one or more sensors comprises a trip switch installed on an external cover piece of the device, the cover piece is removable to provide access to at least a portion of the internal circuitry of the device; and
the trip switch generates a binary signal and changes a logic state of the binary signal in response to detecting that the cover piece of the device has been removed.

* * * * *